US 12,246,880 B2

United States Patent
Lee et al.

(10) Patent No.: US 12,246,880 B2
(45) Date of Patent: Mar. 11, 2025

(54) APPARATUS AND METHOD FOR FORMING CONTAINER AND CONTAINER

(71) Applicant: CJ CHEILJEDANG CORPORATION, Seoul (KR)

(72) Inventors: Byung Kook Lee, Seoul (KR); Kwang Soo Park, Gwacheon-si (KR); Hui Jae Song, Seoul (KR); Gyu Hwan Cha, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 754 days.

(21) Appl. No.: 16/650,253

(22) PCT Filed: Sep. 21, 2018

(86) PCT No.: PCT/KR2018/011310
§ 371 (c)(1),
(2) Date: Mar. 24, 2020

(87) PCT Pub. No.: WO2019/066430
PCT Pub. Date: Apr. 4, 2019

(65) Prior Publication Data
US 2021/0198007 A1 Jul. 1, 2021

(30) Foreign Application Priority Data

Sep. 26, 2017 (KR) .................. 10-2017-0124092
Sep. 20, 2018 (KR) .................. 10-2018-0112663

(51) Int. Cl.
*B29C 51/36* (2006.01)
*B29C 51/10* (2006.01)
(Continued)

(52) U.S. Cl.
CPC .......... *B65D 21/0233* (2013.01); *B29C 51/10* (2013.01); *B29C 51/36* (2013.01); *B29L 2031/712* (2013.01)

(58) Field of Classification Search
CPC ....... B29C 51/306; B29C 51/03; B29C 51/00; B29L 2031/7132; B29L 2031/712; B29D 22/003
See application file for complete search history.

(56) References Cited

U.S. PATENT DOCUMENTS 4,228,121 A * 10/1980 Meadors ............... B29C 51/082
264/296
5,328,655 A * 7/1994 Fortin .................. B29D 22/003
425/383
(Continued)

FOREIGN PATENT DOCUMENTS

CN 101128366 A 2/2008
EP 0529367 A1 * 3/1993
(Continued)

OTHER PUBLICATIONS

Chinese Office Action for CN Application No. 201880061855.1 mailed Apr. 23, 2021 (14 pages).
(Continued)

*Primary Examiner* — Farah Taufiq
*Assistant Examiner* — John W Hatch
(74) *Attorney, Agent, or Firm* — Merchant & Gould P.C.

(57) ABSTRACT

The present invention provides a receptacle molding apparatus, a receptacle and a receptacle molding method. The receptacle molding apparatus, which is for molding a receptacle by means of heat molding, comprises: a first mold portion comprising a body molding part, which is for molding a body of a receptacle, a skirt molding part, which extends upward from the body molding part so as to mold a skirt of the receptacle, and a flange molding part which
(Continued)

extends in the direction from the upper end of the skirt molding part toward the outside so as to mold the lower surface of a flange of the receptacle; and a second mold portion which is provided above the first mold portion, can move vertically and enable pressure-molding of the upper surface of the flange, and has a pressing surface for pressing a sheet which is to be molded into the flange from above at a position corresponding to the flange molding part. The pressing surface comprises an extension part which is a part extending further than the inner end part of the flange molding part in the direction toward the center of the body molding part.

2 Claims, 17 Drawing Sheets

(51) Int. Cl.
*B65D 21/02* (2006.01)
*B29L 31/00* (2006.01)

(56) References Cited

U.S. PATENT DOCUMENTS

| | | |
|---|---|---|
| 7,262,697 B2 | 8/2007 | Meng et al. |
| 8,177,119 B2 | 5/2012 | Littlejohn |
| 8,573,400 B1 | 11/2013 | LaMasney |
| 8,608,895 B2 | 12/2013 | Sato |
| 8,758,665 B2 | 6/2014 | Riethmueller |
| 9,469,444 B2 | 10/2016 | Sato |
| 2006/0182912 A1 | 8/2006 | Sato |
| 2007/0119743 A1 | 5/2007 | Tucker et al. |
| 2008/0041850 A1 | 2/2008 | Tucker et al. |
| 2009/0114659 A1 | 5/2009 | Littlejohn |
| 2012/0055832 A1 | 3/2012 | Riethmueller |
| 2014/0097185 A1 | 4/2014 | Sato |
| 2014/0202915 A1 | 7/2014 | Riethmueller |
| 2015/0353224 A1* | 12/2015 | Naber .............. B29C 51/325 206/557 |

FOREIGN PATENT DOCUMENTS

| | | |
|---|---|---|
| EP | 2636607 A1 | 9/2013 |
| JP | 4-138827 A | 5/1992 |
| JP | 2008-531414 A | 8/2008 |
| JP | 2015-006925 A | 1/2015 |
| KR | 10-2006-0088038 A | 8/2006 |
| KR | 10-2006-0111324 A | 10/2006 |
| KR | 10-2011-0034906 A | 4/2011 |
| KR | 10-2011-0119672 A | 11/2011 |
| KR | 10-1262214 B1 | 5/2013 |

OTHER PUBLICATIONS

International Search Report from International Application No. PCT/KR2018/011310, mailed Jan. 30, 2019.
Written Opinion from International Application No. PCT/KR2018/011310, mailed Jan. 30, 2019.
Notice of Allowance issued in corresponding Korean Application No. 10-2018-0112663, mailed Apr. 28, 2020.

* cited by examiner

APPARATUS AND METHOD FOR FORMING CONTAINER AND CONTAINER

This application is a National Stage Application of International Application No. PCT/KR2018/011310, filed Sep. 21, 2018, which claims benefit of Serial No. 10-2018-0112663, filed Sep. 20, 2018 in the Republic of Korea and also claims benefit of Serial No. 10-2017-0124092, filed Sep. 26, 2017 in the Republic of Korea and which applications are incorporated herein by reference. To the extent appropriate, a claim of priority is made to each of the above disclosed applications.

TECHNICAL FIELD

The present disclosure relates to a container forming apparatus, a container, and a container forming method, and more particularly, relates to a container forming apparatus, a container, and a container forming method for minimizing a jamming phenomenon during stacking.

BACKGROUND ART

In general, food packing containers are formed by a hot forming technique using a sheet of thin fabric. The hot forming technique has an environmentally-friendly advantage in terms of mass-production of containers with one mold and the use of thin fabric. Due to the nature of the hot forming technique, the outside and inside surfaces of the packing containers produced by the hot forming technique are always manufactured in the same shape, and because the thin sheet fabric is used, the formed packing containers are characterized by flexibility.

However, because the conventional packing containers formed in this way have the inside surface and the outside surface in the same shape and have a flexible form, a jamming phenomenon may occur in a state in which the packing containers are stacked. If the jamming phenomenon occurs when the containers are stacked, a process of automatically feeding the packing containers into food packing equipment may not be smoothly performed during an instant food automation manufacture process. Therefore, a problem may arise in which productivity is lowered in the instant food manufacture process.

A packing container 1 formed by using a conventional hot forming technique and apparatus is illustrated in FIGS. 1 and 2. Referring to FIGS. 1 and 2, the conventional packing container 1 may include a container body 2, a skirt 3, and a flange 4. A step 7 may be formed on a connecting portion between the container body 2 and the skirt 3.

An inverted taper structure in which the skirt 3 is formed to be inclined is used to prevent jamming when the conventional packing container is stacked. However, when the angle of the inverted taper of the skirt 3 is large, it is difficult to extract the formed packing container 1 from a mold. In contrast, when the angle of the inverted taper of the skirt 3 is small, the packing container is easy to extract from the mold, but as illustrated in FIG. 1, it is difficult to stack the packing container. Specifically, the step 7 of the packing container 1 stacked above is not well stopped by the flange 4 (or the upper end of the skirt) of the packing container 1 stacked below so that it is difficult to stack the packing containers in an upright position. Due to this, a problem may arise in which portions A are crushed by press-fitting.

To solve this problem, in KR patent No. 10-1262214 (refer to patent document 1), as illustrated in FIG. 2, a plurality of support steps 5 (having a groove shape inside a container) are formed at different angles. However, even in the case of patent document 1, a problem still arises in which the support steps 5 of the container stacked above are jammed in the grooves 5 of the container 1 stacked below. Further, in this case, the containers formed in a mold having the same shape are not alternately stacked in the grooves inside the containers, and therefore a plurality of molds having different shapes are required. In addition, problems arise in which the exterior of the packing container is degraded by the grooves formed inside the packing container and contents are inserted into the grooves.

RELATED ART DOCUMENT

Patent Document (Patent Document 1) KR Patent No. 10-1262214

DISCLOSURE

Technical Problem

The present disclosure has been made to solve the above-mentioned problems. An aspect of the present disclosure provides a container forming apparatus, a container, and a container forming method for minimizing a jamming phenomenon between containers when the formed containers are stacked, by forming the inside surface and the outside surface of a formed skirt in different shapes.

Furthermore, another aspect of the present disclosure provides a food manufacturing method for improving productivity in food manufacturing by smoothly feeding containers in a manufacturing process by minimizing a jamming phenomenon when the containers are stacked.

Technical Solution

To achieve the objectives, a container forming apparatus for forming a container by hot forming according to the present disclosure includes a first mold that includes a main-body forming part that forms a main body of the container, a skirt forming part extending upward from the main-body forming part to form a skirt of the container, and a flange forming part extending from an upper end of the skirt forming part in a direction toward the outside to form a lower surface of a flange of the container, and a second mold that is provided over the first mold and vertically movably installed to press an upper surface of the flange and that includes a pressing surface that presses down on a sheet, which is to be formed into the flange, in a location corresponding to the flange forming part. The pressing surface includes an extension that is a portion further extending in a direction toward the center of the main-body forming part beyond an inner end portion of the flange forming part.

Furthermore, a container according to the present disclosure includes a main body, a skirt extending upward from an upper end of the main body, and a flange extending from an upper end portion of the skirt in a direction toward the outside. The skirt includes, on an inside surface of an upper end portion connected with the flange, a protrusion protruding toward the center of the main body along a circumferential direction of the inside surface.

In addition, a container forming method according to the present disclosure includes a heating step of heating a sheet that is a subject to be formed into a container, a first forming step of forming a main body and a skirt of the container by press-fitting the heated sheet into a first mold and bringing the sheet into close contact with the first mold by injection of compressed air and vacuum suction, and a second forming step of forming a flange by pressing, by a pressing surface included in a second mold that moves toward the first mold, the sheet that is to be formed into the flange. The pressing surface includes an extension that is a portion further extending in a direction toward the center of the main body beyond an inner end portion of a flange forming part included in the first mold, and in the second forming step, when the pressing surface presses the sheet that is to be formed into the flange, the sheet is pushed by the extension to conglomerate and form a protrusion on an upper end portion of the skirt.

Advantageous Effects

The container forming apparatus and method according to the present disclosure includes, on the pressing surface of the second mold, the extension extending toward the center of the main-body forming part and forms the protrusion on the portion where the skirt and the flange of the formed container are connected, thereby forming the inside surface and the outside surface of the formed skirt in different shapes. Accordingly, when the containers according to the present disclosure are stacked, a jamming phenomenon between the containers may be minimized.

MODE FOR INVENTION

Hereinafter, exemplary embodiments of the present disclosure will be described in detail with reference to the accompanying drawings.

The following embodiments are embodiments appropriate for the understanding of technical features of a container forming apparatus, a container, and a container forming method according to the present disclosure. However, the present disclosure is not limited to the following embodiments, and technical features of the present disclosure are not restricted by the following embodiments. Furthermore, various changes and modifications can be made without departing from the spirit and scope of the present disclosure.

Figure 1:
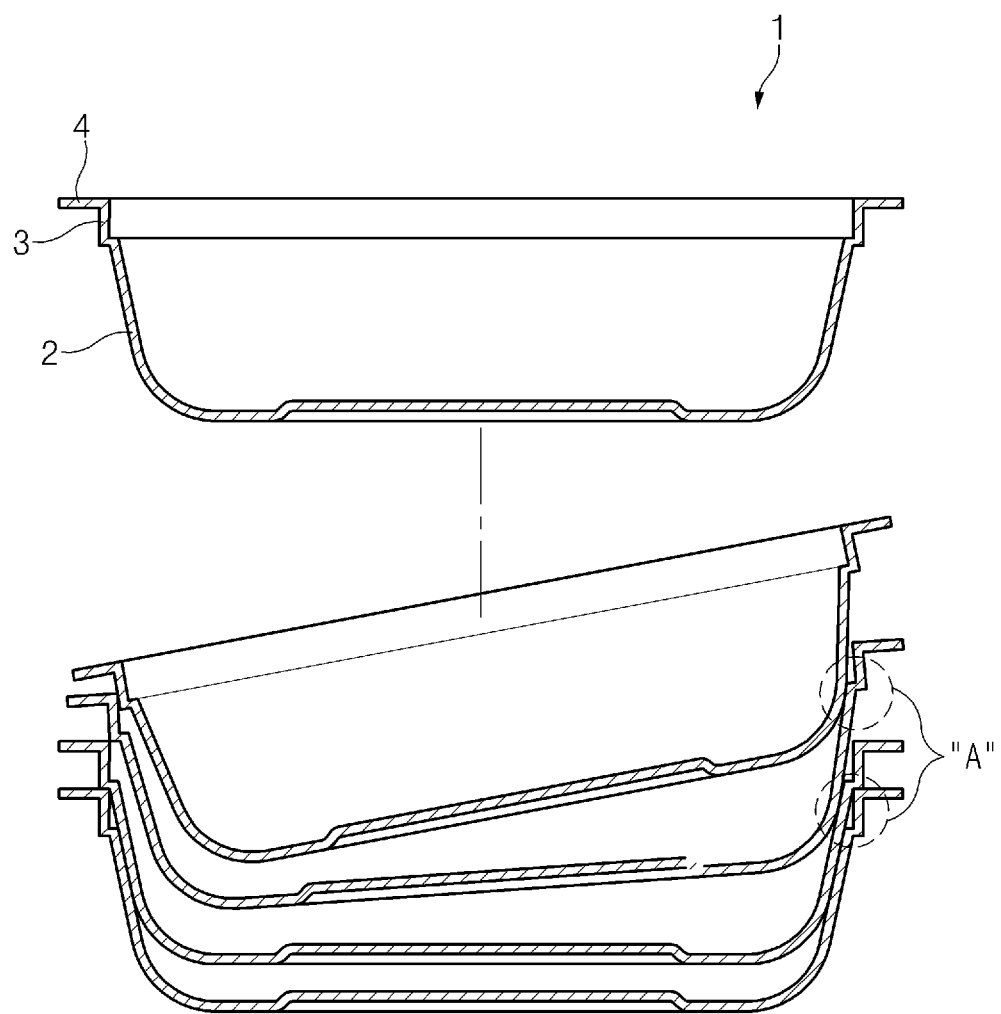
FIG. 1 is a side sectional view illustrating a state in which conventional packing containers are stacked.
Figure 2:
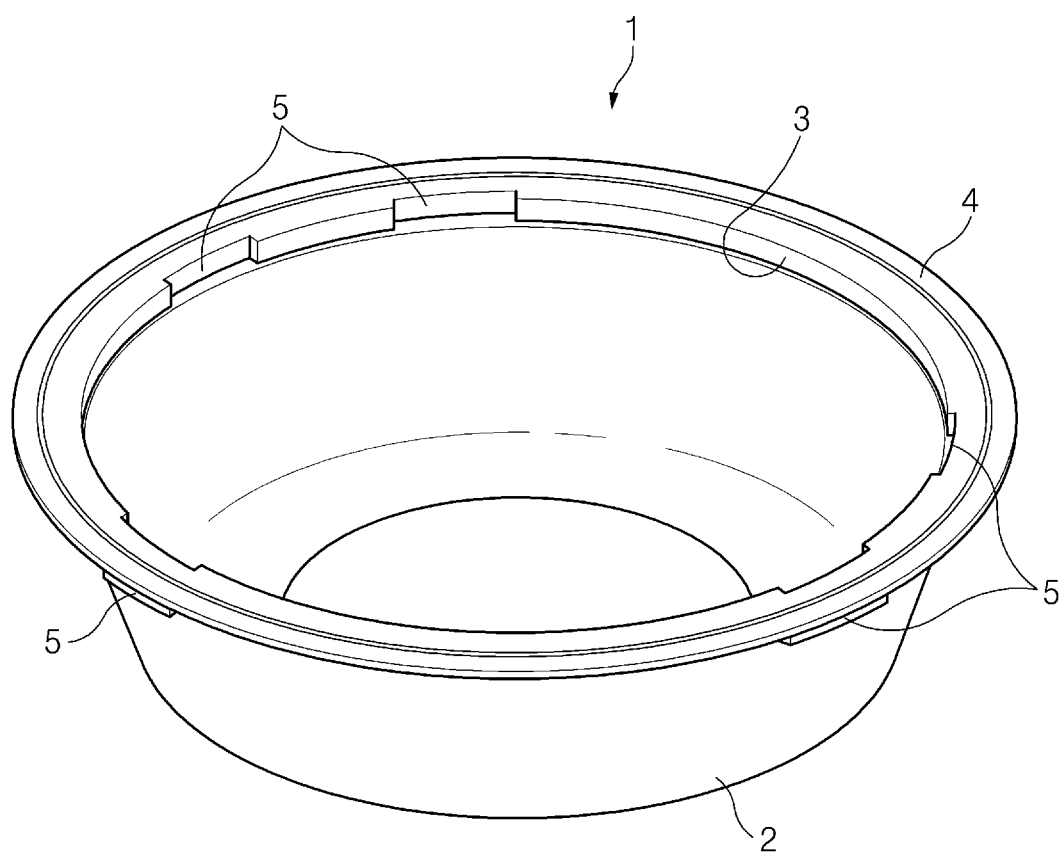
FIG. 2 is a perspective view illustrating a conventional packing container.
Figure 3:
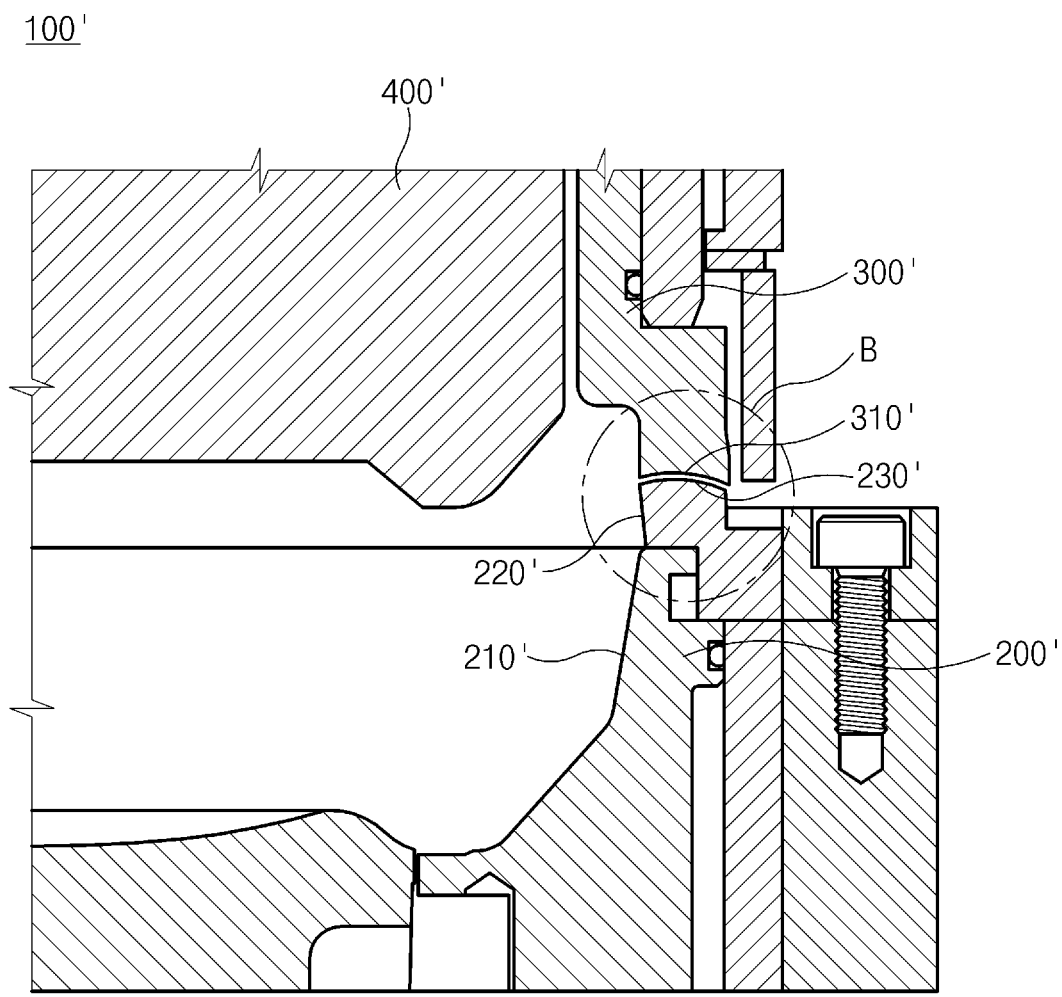
FIG. 3 is an enlarged sectional view illustrating a conventional mold for manufacturing a container.
Figure 4:
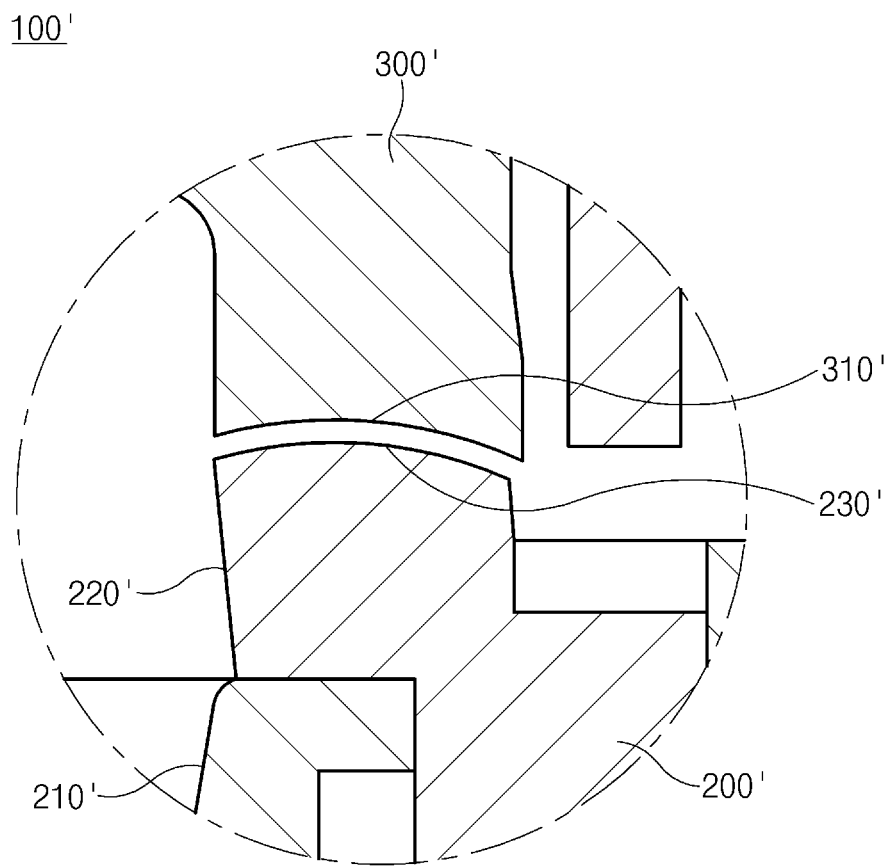
FIG. 4 is an enlarged sectional view of portion B of FIG. 3.
Figure 5:
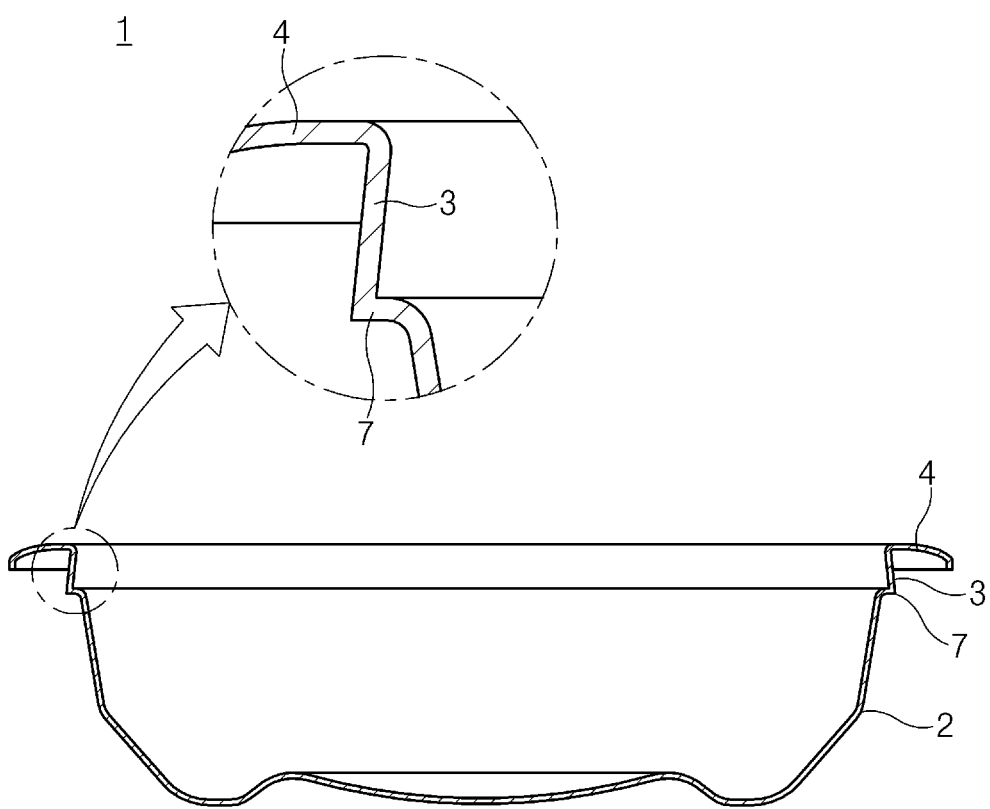
FIG. 5 is a sectional view of a container manufactured by using the container manufacturing mold of FIG. 3.

First, a conventional container forming apparatus 100' is illustrated in FIGS. 3 to 5. Referring to FIGS. 3 to 5, the conventional container forming apparatus may include a first mold 200', a second mold 300', and a plug 400'. The first mold 200' may include a main-body forming part 210', a skirt forming part 220', and a flange forming part 230'. Furthermore, the second mold 300' may be provided over the first mold 200' so as to vertically slide and may include a pressing surface 310' that is opposite the flange forming part 230'.

When the conventional container forming apparatus 100' is used, an inside surface and an outside surface of the formed container 1 are formed in the same shape due to the nature of a hot forming method. In particular, when the location of an inner end portion of the pressing surface 310' of the second mold 300' is the same as the location of an inner end portion of the flange forming part 230' as in the conventional container forming apparatus 100', an inside surface and an outside surface of the skirt 3 of the formed container 1 are formed in the same shape (refer to FIG. 5).

Figure 14:
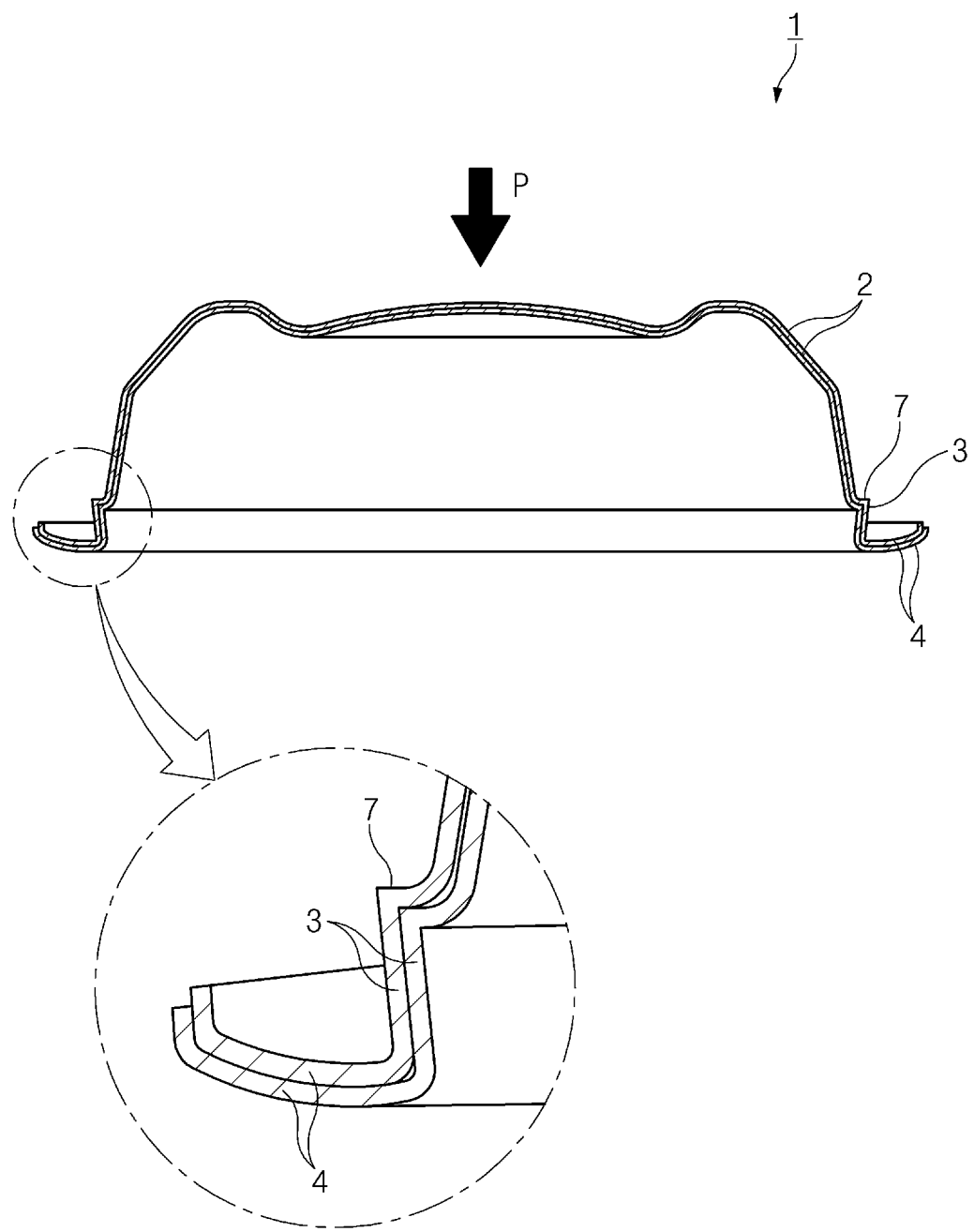
FIG. 14 is a sectional view illustrating a state in which conventional packing containers are stacked.

However, because the container 1 formed by the conventional container forming apparatus 100' is made of a thin sheet and therefore provided in a flexible form and in particular, the inside surface and the outside surface of the skirt 3 are formed in the same shape, a problem may arise in which when the containers 1 are stacked, the vertically stacked containers 1 are easily jammed (refer to FIG. 14).

Figure 9:
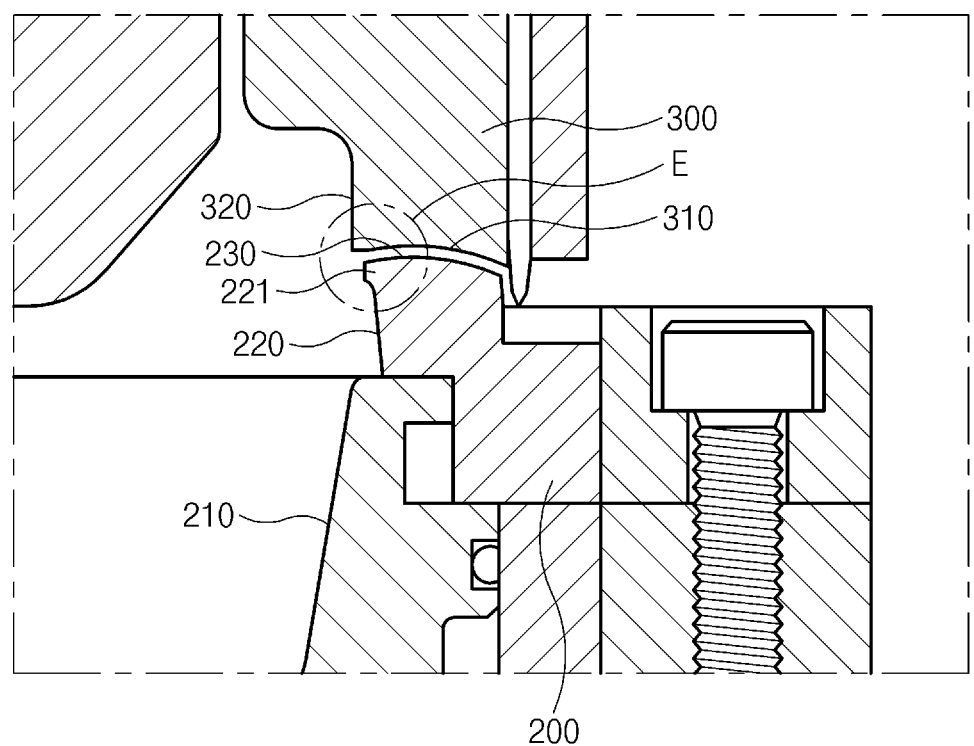
FIG. 9 is an enlarged sectional view of a container forming apparatus according to another embodiment of the present disclosure.
Figure 10:
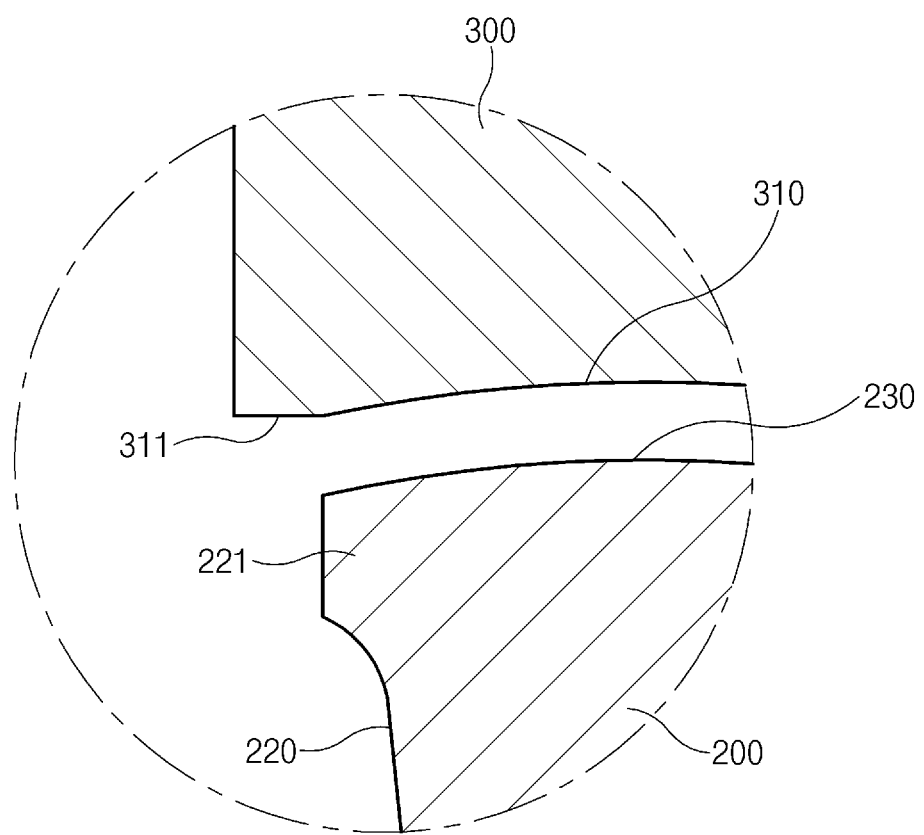
FIG. 10 is an enlarged view of portion E of FIG. 9.
Figure 11:
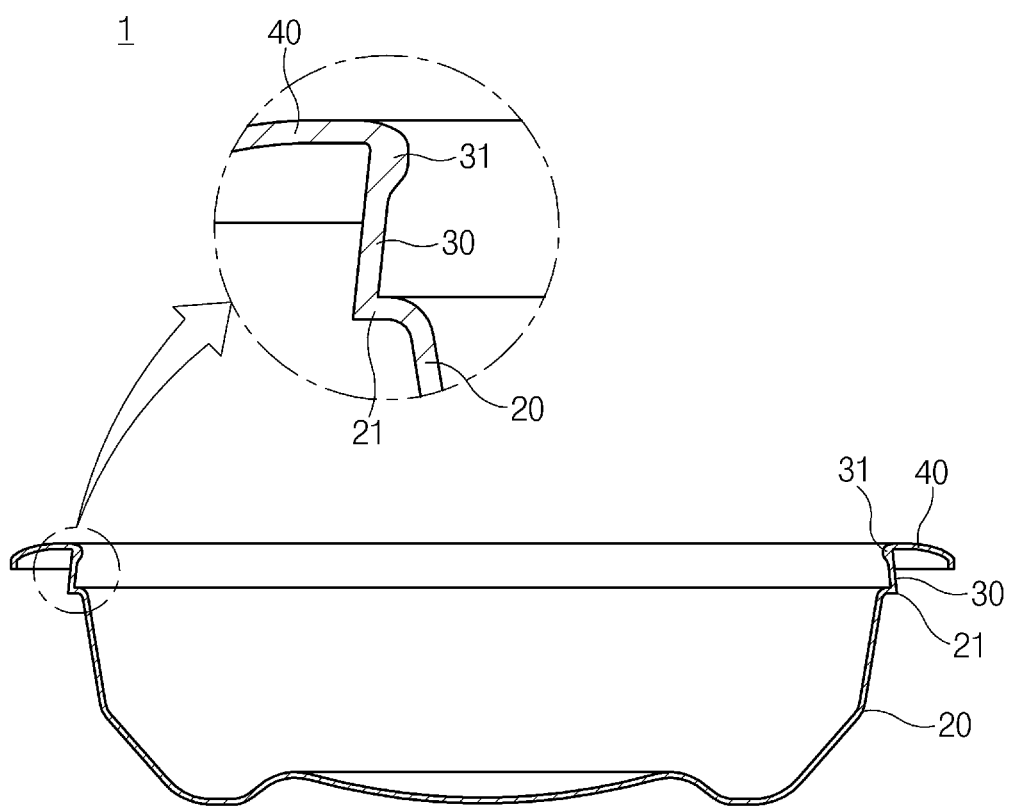
FIG. 11 is a sectional view of a container formed by the container forming apparatus illustrated in FIG. 6.
Figure 12:
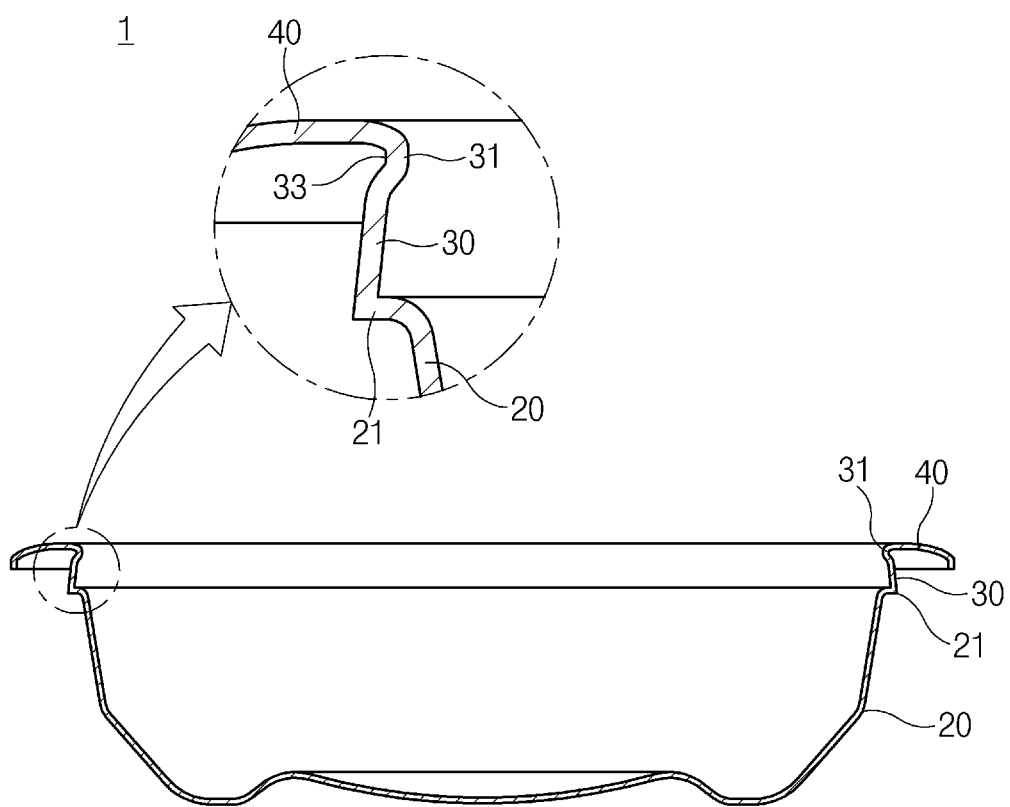
FIG. 12 is a sectional view of a container formed by the container forming apparatus illustrated in FIG. 9.
Figure 13:
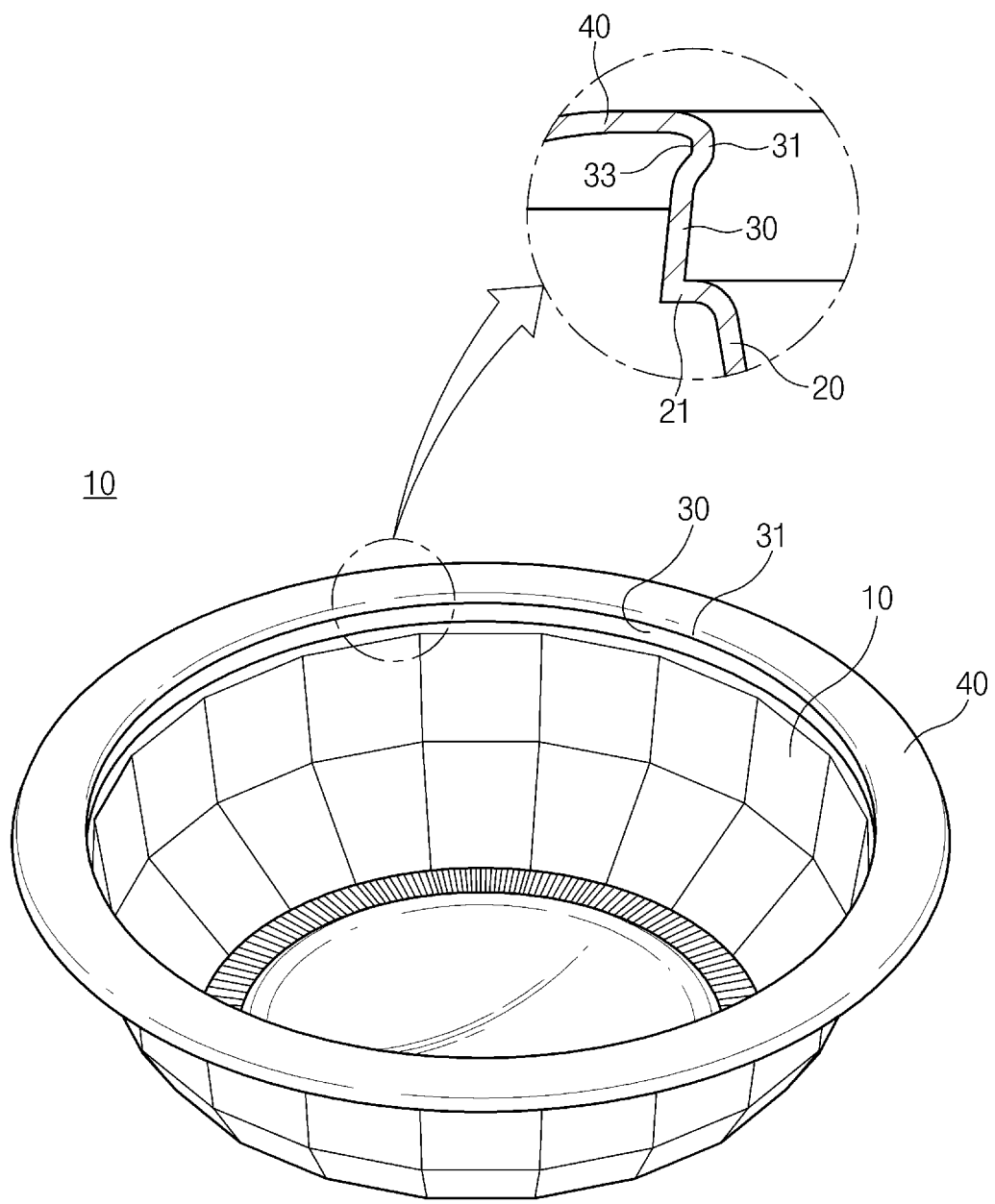
FIG. 13 is a perspective view of the container illustrated in FIG. 12.

A container forming apparatus and a container according to the present disclosure for solving this problem are illustrated in FIGS. 6 to 13. The container forming apparatus according to the present disclosure is illustrated in FIGS. 6 to 10, and the container formed by the container forming apparatus is illustrated in FIGS. 11 and 13.

First, the container 10 according to the present disclosure will be described with reference to FIGS. 11 to 13.

The container 10 according to the present disclosure includes a main body 20, a skirt 30, and a flange 40.

The main body 20 may include a bottom surface and a side surface and may form a receiving space in which instant foods, which are contents, are received.

The skirt 30 may extend upward from an upper end of the main body 20. The skirt 30 is a portion that extends upward from the upper end of the main body 20 and in which an inverted taper is formed. Specifically, the skirt 30 may be formed in an inverted taper structure by being formed to be inclined in a direction toward the center of the main body 20 as the skirt 30 extends upward from the upper end of the main body 20. A step 21 may be formed at the top of the main body 20 that is connected with the skirt 30. When the container 10 is stacked later, the step 21 may be stopped by a skirt 30 (or a flange 40) of an adjacent stacked container 10 and may serve to prevent jamming.

The angle of the skirt 30 may be applied without limitation as long as the skirt 30 is formed in an inverted taper structure. For example, the skirt 30 may be formed at an angle of 80° to 87° with respect to an extension line that horizontally extends in a direction toward the center of the container 10 from a lower end of the skirt 30. Specifically, the skirt 30 may be formed at an angle of 82° to 84°, more specifically, 83° to 84°. When the slope of the skirt 30 is less than 80° with respect to the extension line, the skirt 30 is steeply inclined, and therefore it may be difficult to extract the formed container 10. When the slope of the skirt 30 exceeds 87° with respect to the extension line, it may be difficult to obtain an effect of preventing the container 10 from being jammed.

The flange 40 extends outward from an upper end portion of the skirt 30. Specifically, the flange 40 may be formed horizontally from the upper end portion of the skirt 30, and an inner end portion of the flange 40 and the upper end portion of the skirt 30 may be connected together while forming a certain angle.

Here, the skirt 30 may include a protrusion 31. The protrusion 31 protrudes toward the center of the main body 20 from an inside surface of the upper end portion, which is connected with the flange 40, along the circumferential direction of the inside surface. Specifically, the protrusion 31 may protrude from an upper end of the inside surface of the skirt 30 in a tube shape (refer to FIG. 11).

The inside surface and the outside surface of the skirt 30 applied to the present disclosure may be formed in different shapes due to the protrusion 31. That is, the inside surface and the outside surface of the skirt 30 may be asymmetrically formed with respect to the center of the thickness of the skirt 30. Accordingly, when the containers 10 according to the present disclosure are stacked, the protrusion 31 of the container 10 stacked later may be stopped by the step 21 of the container 10 stacked first, without overlapping and therefore the containers 10 may be prevented from being jammed (refer to FIG. 16). That is, because the container 10 according to the present disclosure forms the protrusion 31 protruding from the upper end portion of the inside surface of the skirt 30 while maintaining the angle of the skirt 30, the formed container 10 may be easily extracted in the process of forming the container 10, and jamming may be prevented when the formed container 10 is stacked. Here, the protrusion 31 may protrude to a size of, for example, 1 mm to 3 mm. However, the protrusion 31 is not limited thereto.

Meanwhile, another embodiment of the container 10 according to the present disclosure is illustrated in FIGS. 12 and 13. In the container 10 according to the other embodiment, the skirt 30 may further include a groove 33. The groove 33 may be concavely formed on the outside surface of the upper end portion, which is connected with the flange 40, along the circumferential direction of the outside surface.

Hereinafter, the container forming apparatus 100 according to the present disclosure will be described with reference to FIGS. 6 to 10.

Figure 6:
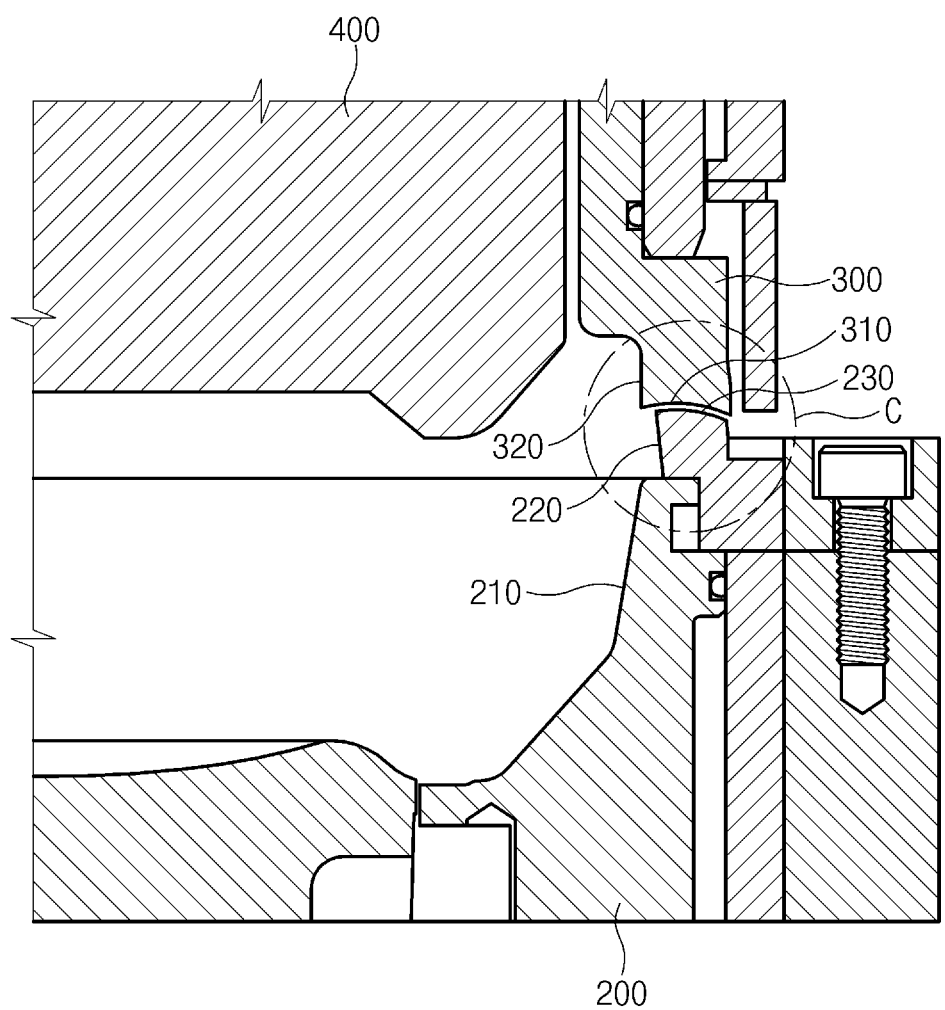
FIG. 6 is an enlarged sectional view of a container forming apparatus according to the present disclosure.
Figure 7:
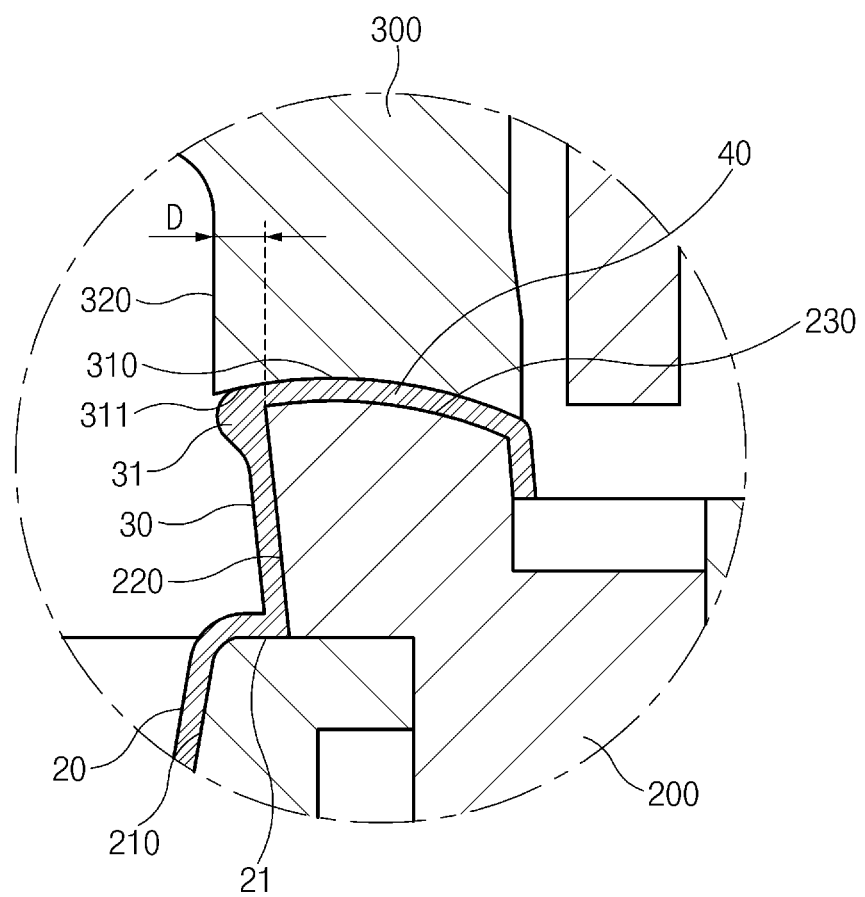
FIG. 7 is an enlarged view of portion C of FIG. 6.

Referring to FIGS. 6 and 7, the container forming apparatus 100 according to an embodiment of the present disclosure includes a first mold 200 and a second mold 300.

The first mold 200 includes a main-body forming part 210, a skirt forming part 220, and a flange forming part 230.

The main-body forming part 210 forms the main body 20 of the container 10. The skirt forming part 220 extends upward from the main-body forming part 210 to form the skirt 30 of the container 10. Furthermore, the flange forming part 230 extends outward from an upper end of the skirt forming part 220 to form a lower surface of the flange 40 of the container 10.

The first mold 200 may include the main-body forming part 210, the skirt forming part 220, and the flange forming part 230 and may serve as a cavity mold in which the container 10 is formed.

The second mold 300 is provided over the first mold 200 and is vertically movably installed to press an upper surface of the flange 40. Furthermore, the second mold 300 includes a pressing surface 310 that presses down on a sheet, which is to be formed into the flange 40, in a location corresponding to the flange forming part 230. Here, the pressing surface 310 includes an extension 311 that is a portion further extending in a direction toward the center of the main-body forming part 210 beyond an inner end portion of the flange forming part 230.

Specifically, the skirt 30 includes, on the inside surface of the upper end portion connected with the flange 40, the protrusion 31 protruding toward the center of the main body 20 along the circumferential direction of the inside surface, and therefore the inside surface and the outside surface of the skirt 30 may be asymmetrically formed on the vertical cross-section.

Further, when the sheet to be formed into the flange 40 is pressed by the pressing surface 310 of the second mold 300, the sheet may be pushed by the extension 311 to conglomerate and form the protrusion 31 (refer to FIG. 7).

More specifically, the second mold 300 may have a relatively lower temperature than the sheet heated for forming. Accordingly, as the pressing surface 310 of the second mold 300 presses the sheet portion that is to be formed into the flange 40, the sheet may be pushed to conglomerate under the extension 311. The conglomerate portion of the sheet may be the protrusion 31 that protrudes from the upper end portion of the skirt 30, that is, the inner end portion of the flange 40.

The container forming apparatus 100 according to the present disclosure may include, on the pressing surface 310 of the second mold 300, the extension 311 extending toward the center of the main-body forming part 210 and may therefore form the protrusion 31 on the portion where the skirt 30 and the flange 40 are connected. The inside surface and the outside surface of the skirt 30 formed by the protrusion 31 are asymmetrically formed, and thus when the formed containers 10 are stacked, a jamming phenomenon between the containers 10 may be minimized.

The second mold 300 includes the extension 311, and therefore an inside surface 320 of a lower end portion of the second mold 300 may be disposed inward of the skirt forming part 220 (in the direction toward the center of the main-body forming part 210). Here, referring to FIG. 7, on the vertical cross-section of the first mold 200 and the second mold 300, the distance D from a line vertically extending from the inner end portion of the extension 311 to a line vertically extending from the inner end portion of the flange forming part 230 may be formed to be 1 mm to 5 mm.

That is, the inside surface 320 of the lower end portion of the second mold 300 may be formed to be located 1 mm to 5 mm inward from the upper end of the skirt forming part 220. Here, when the distance D is less than 1 mm, the container 10 formed by the container forming apparatus 100 may be jammed when stacked. In contrast, when the distance D exceeds 5 mm, the thickness of the formed container 10 may not be constant because the diameter of a plug 400 has to be reduced. Here, the plug 400 is provided inside the second mold 300 and over the first mold 200 and serves to press the sheet inserted between the first mold 200 and the second mold 300 toward the first mold 200.

Meanwhile, the pressing surface 310 may be formed in a curved-surface shape, and the extension 311 may extend to form a curved surface having the same curvature as the pressing surface 310 (refer to FIG. 7).

Here, the height of the inner end portion of the extension 311 may be lower than the height of the outer end portion of the extension 311 (the portion that meets the line vertically extending from the inner end portion of the flange forming part 230) by 0.1 mm to 0.3 mm. Accordingly, the shape of the protrusion 31 included in the container 10 may be adjusted.

Figure 8:
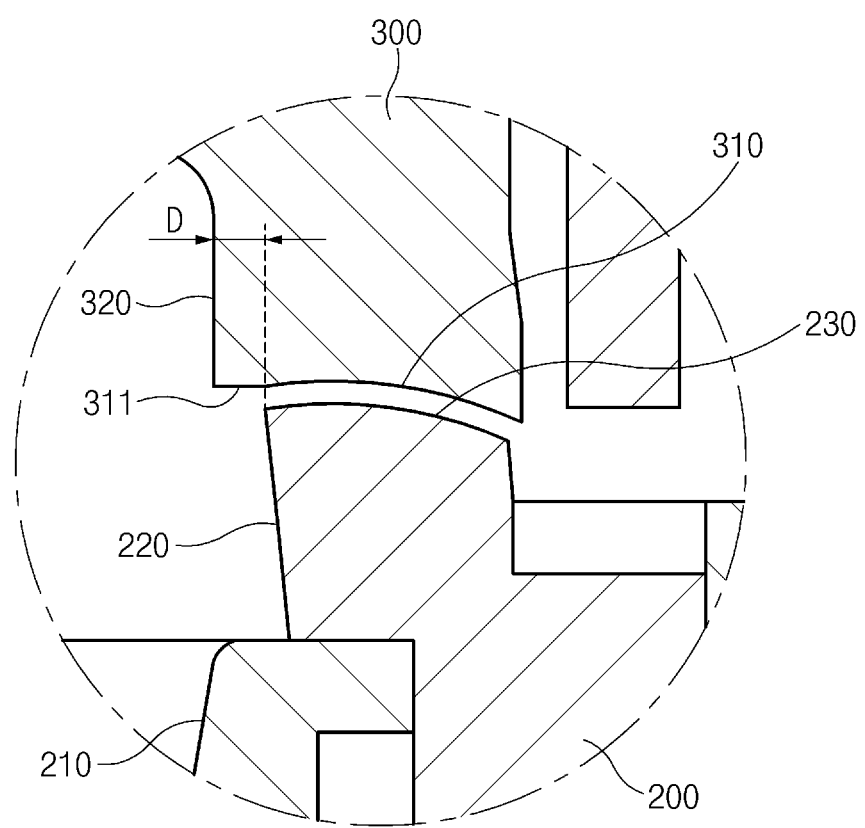
FIG. 8 is an enlarged sectional view illustrating a case where an extension is flat in portion C of FIG. 6.

Meanwhile, another embodiment of the present disclosure is illustrated in FIG. 8. The other embodiment of the present disclosure differs from the embodiment illustrated in FIGS. 6 and 7 in terms of the shape of the extension 311.

The extension 311 according to the other embodiment may be formed to be flat in the horizontal direction.

Accordingly, when the pressing surface 310 presses the container 10 that is to be formed into the flange 40, the second mold 300 according to the other embodiment of the present disclosure may allow the sheet to conglomerate better under the extension 311, compared to the embodiment described above. Thus, the protrusion 31 may protrude better.

Meanwhile, another embodiment of the present disclosure is illustrated in FIGS. 9 and 10. The other embodiment of the present disclosure differs from the embodiments illustrated in FIGS. 6 to 8 in that a protrusion 221 is formed on the skirt forming part 220.

Specifically, as described above, the skirt 30 may include the groove 33 concavely formed on the outside surface of the upper end portion, which is connected with the flange 40, along the circumferential direction of the outside surface. Further, the skirt forming part 220 may include the protrusion 221 that protrudes along the circumferential direction of the upper end portion to form the groove 33.

Here, the skirt forming part 220 may be formed to be inclined in the direction toward the center of the main-body forming part 210 as the skirt forming part 220 extends upward from the upper end of the main-body forming part 210. That is, the skirt forming part 220 may form the skirt 30 such that the skirt 30 has an inverted taper structure.

The protrusion 221 provided on the skirt forming part 220 may form the groove 33 like the extension 31, thereby making the inside surface and the outside surface of the skirt 30 asymmetrical and forming the skirt 30 in a doubly broken shape. Furthermore, when the pressing surface 310 presses the sheet that is to be formed into the flange 40, a phenomenon in which the sheet is pushed by the protrusion 221 may be induced better to allow the protrusion 31 to further protrude. Accordingly, an effect of preventing jamming between the formed containers 10 may be maximized.

The protrusion 221 may be provided such that an inner end portion of the protrusion 221 is located 1 mm to 3 mm inward from the skirt forming part 220 on which the protrusion 221 is not formed. That is, the protrusion 221 may be formed to a size of 1 mm to 3 mm. In the case where the size by which the protrusion 221 protrudes is less than 1 mm, an effect of preventing jamming may be insignificant when the container 10 is stacked, and in the case where the size by which the protrusion 221 protrudes exceeds 3 mm, it may be difficult to extract the formed container 10.

Hereinafter, a method of forming the container 10, which is another aspect of the present disclosure, will be described with reference to FIGS. 6 to 13.

The container forming method according to the present disclosure includes a heating step, a first forming step, and a second forming step.

In the heating step, a sheet that is a subject to be formed into the container 10 is heated. Here, any plastic material capable of being used to manufacture the container 10 may be applied for the sheet without limitation. For example, polypropylene, PP/EVOH/PP, polystyrene, polyethylene, PET, or the like may be applied. In particular, when plastic containing polyethylene is used as a fabric sheet, the formed container 10 may have firmness and resilience. However, the sheet applied to the present disclosure is not limited thereto.

In the first forming step, the main body 20 and the skirt 30 of the container 10 are formed by press-fitting the heated sheet into the first mold 200 and bringing the sheet into close contact with the first mold 200 by injection of compressed air and vacuum suction.

Specifically, when the sheet having a certain thickness is heated to a temperature appropriate for forming, the sheet may be firstly press-fit into the first mold 200 by using the plug 400. The sheet may be brought into close contact with the first mold 200 by injecting compressed air, and the sheet may be further brought into close contact with the first mold 200 by creating a vacuum between the sheet and the first mold 200 by vacuum suction. Accordingly, the main body 20 and the skirt 30 of the container 10 may be formed.

In the second forming step, the pressing surface 310 included in the second mold 300 that moves toward the first mold 200 presses the sheet, which is to be formed into the flange 40, and forms the flange 40.

Here, the pressing surface 310 may include the extension 311 that is a portion further extending in the direction toward the center of the main body 20 beyond the inner end portion of the flange forming part 230 included in the first mold 200. Further, in the second forming step, when the pressing surface 310 presses the sheet that is to be formed into the flange 40, the sheet may be pushed by the extension 311 to conglomerate and form the protrusion 31 on the upper end portion of the skirt 30.

The completely formed container 10 may be cut at the same time as or after the flange 40 is completely formed in the second forming step. Further, the formed container 10 may be extracted. Here, cutting and extracting the container 10 may be performed irrespective of the sequence.

As described above, in the container forming method according to the present disclosure, the pressing surface 310 of the second mold 300 may include the extension 311 extending toward the center of the main-body forming part 210 and may form the protrusion 31 on the portion where the skirt 30 and the flange 40 are connected. Due to the protrusion 31, the inside surface and the outside surface of the formed skirt 30 may be asymmetrically formed, and thus a jamming phenomenon between the containers 10 may be minimized when the formed containers 10 are stacked.

Meanwhile, the skirt forming part 220 included in the first mold 200 may include the protrusion 221 that protrudes from the upper end portion along the circumferential direction. Further, in the first forming step, the groove 33 may be concavely formed on the outside surface of the upper end portion of the skirt 30 along the circumferential direction of the outside surface by the protrusion 221.

Accordingly, when the pressing surface 310 presses the sheet that is to be formed into the flange 40, a phenomenon in which the sheet is pushed by the protrusion 221 may be induced better to allow the protrusion 31 to further protrude. Thus, an effect of preventing jamming between the formed containers 10 may be maximized.

Meanwhile, a food manufacturing method according to another aspect of the present disclosure will be described below. Hereinafter, detailed description of a configuration overlapping with the container and the container forming method will be omitted.

The food manufacturing method according to the present disclosure includes a container feeding step, a food filling step, and a step of sealing the container 10.

In the container feeding step, a plurality of containers 10 stacked may be individually fed into food packing equipment. The containers 10 may be fed through an automated apparatus. However, the present disclosure is not limited thereto.

The present disclosure is provided such that a jamming phenomenon between the containers 10 stacked in a container stacking step is minimized. Therefore, the process of individually feeding the containers 10 in the container feeding step may be smoothly performed.

Specifically, the container 10 applied to the present disclosure, that is, the container 10 according to the present disclosure includes the main body 20, the skirt 30, and the flange 40.

The main body 20 may include the bottom surface and the side surface and may form the receiving space in which instant foods, which are contents, are received. The skirt 30 may extend upward from the upper end of the main body 20. The skirt 30 is a portion that extends upward from the upper end of the main body 20 and in which the inverted taper is formed. The flange 40 extends outward from the upper end portion of the skirt 30. Here, the skirt 30 may include the protrusion 31. The protrusion 31 protrudes toward the center of the main body 20 from the inside surface of the upper end portion, which is connected with the flange 40, along the circumferential direction of the inside surface.

The inside surface and the outside surface of the skirt 30 applied to the present disclosure may be formed in different shapes due to the protrusion 31. That is, the inside surface and the outside surface of the skirt 30 may be asymmetrically formed with respect to the center of the thickness of the skirt 30. Accordingly, when the containers 10 according to the present disclosure are stacked, the protrusion 31 of the container 10 stacked later may be stopped by the step 21 of the container 10 stacked first, without overlapping and therefore jamming between the containers 10 may be prevented (refer to FIG. 16).

In the food filling step, the fed container 10 is filled with foods that are contents. Further, the step of sealing the container is performed.

The food manufacturing method according to the present disclosure may further include a container sterilizing step. The container sterilizing step may be a step of sterilizing the container and may be performed after the container is fed. For example, the container sterilizing step may be performed before and after the food filling step or before and after a food sealing step.

Figure 15:
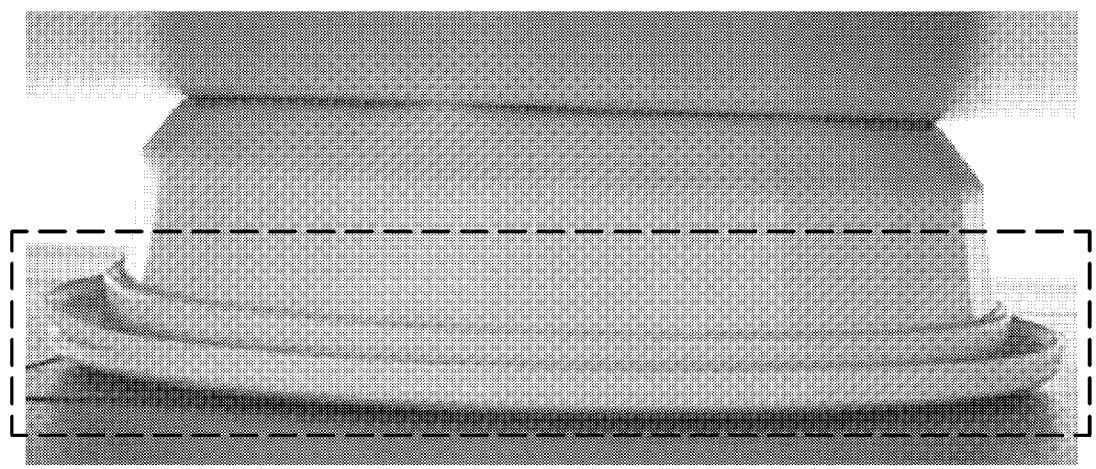
FIG. 15 is an experimental picture obtained by testing a jamming phenomenon by pressing the stacked packing containers of FIG. 14.
Figure 16:
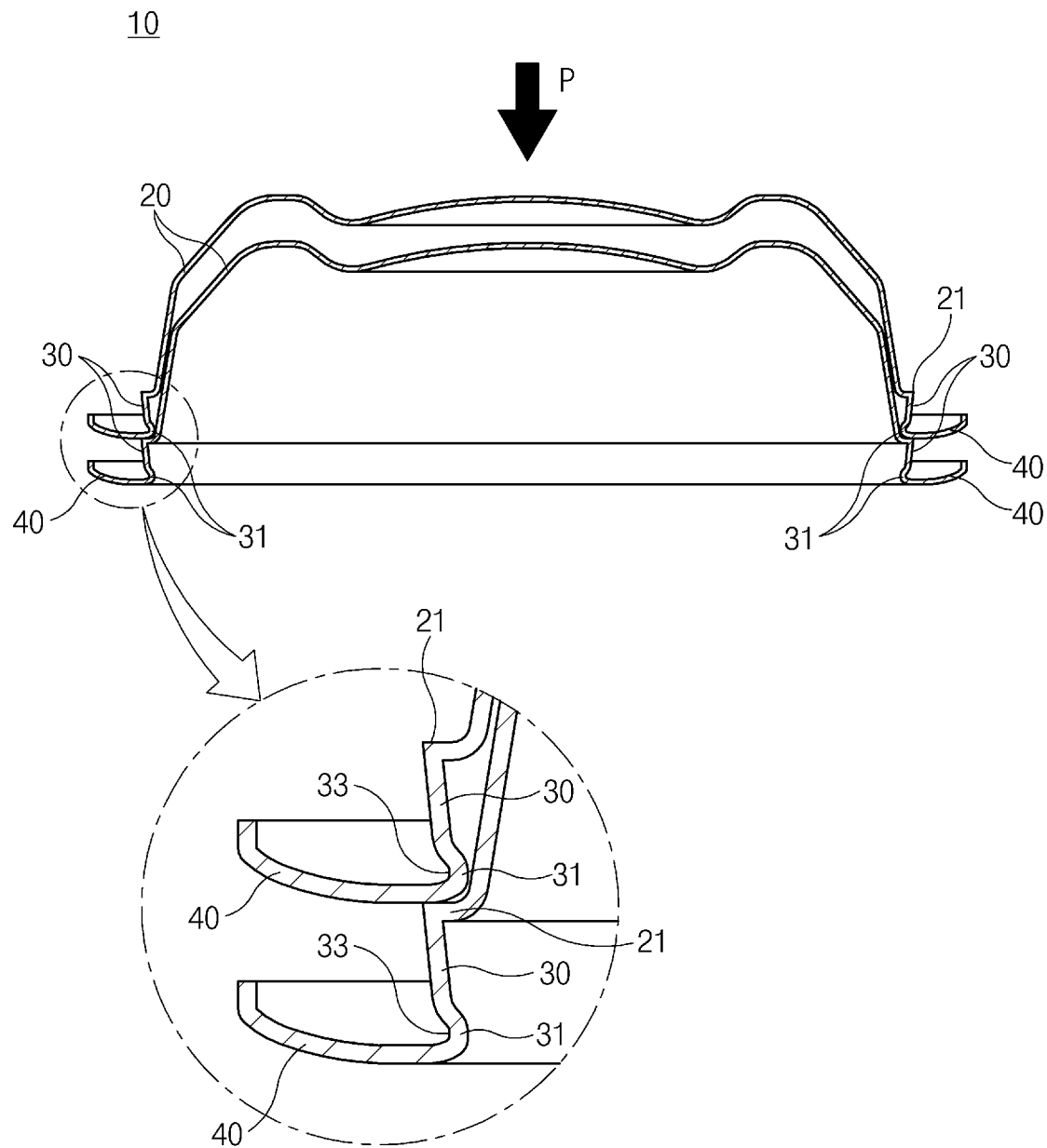
FIG. 16 is a sectional view illustrating a state in which containers according to the present disclosure are stacked.
Figure 17:
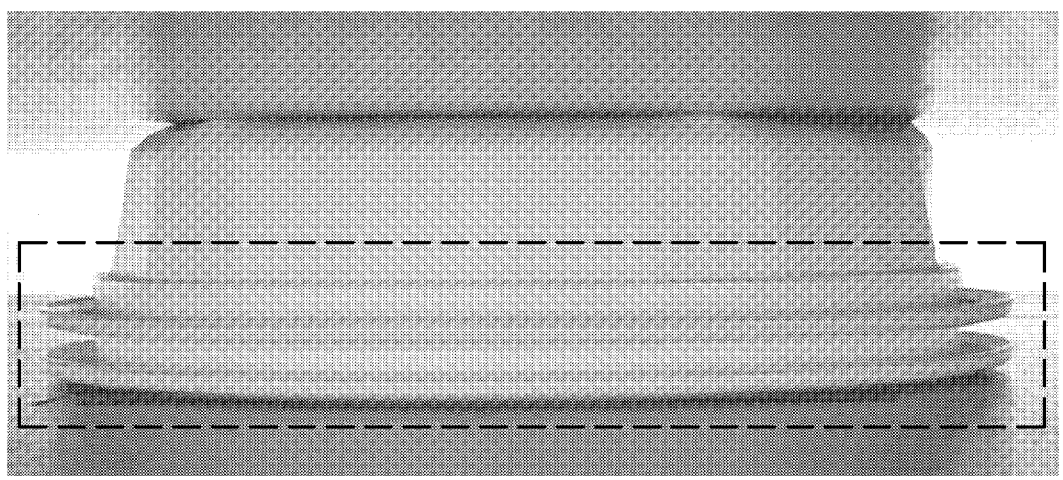
FIG. 17 is an experimental picture obtained by testing a jamming phenomenon by pressing the stacked containers of FIG. 16.

Meanwhile, hereinafter, an effect of the present disclosure will be described by comparing an experiment of a jamming phenomenon in a comparative example illustrated in FIGS. 14 and 15 and an experiment of a jamming phenomenon in an experimental example using the present disclosure that is illustrated in FIGS. 16 and 17. However, the present disclosure is not limited to the following experimental example, and the following experimental example is an embodiment within the technical scope of the present disclosure.

In the comparative example illustrated in FIGS. 14 and 15, the container 1 (refer to FIG. 5) formed by the conventional container forming apparatus 100 (refer to FIGS. 3 and 4) is used. In the experimental example illustrated in FIGS. 16 and 17, the container 10 (refer to FIGS. 12 and 13) formed by the container forming apparatus 100 according to the present disclosure (refer to FIGS. 8 and 9) is used. That is, the comparative example differs from the experimental example in that the former does not include the extension 311 of the first mold 200 and the protrusion 221 of the second mold 300.

In the comparative example and the experimental example, the containers 10 formed by using the respective container forming apparatuses 100 are stacked, and jammed states of the containers 10 are identified by applying a pressure P of 10 kgf by a compressive strength tester.

In the comparative example, the experimental result shows that a jamming phenomenon occurs between the conventional containers 1 stacked. In contrast, in the experimental example, it can be seen that no jamming phenomenon occurs between the stacked containers 10 according to the present disclosure. Specifically, because the shapes of the inside surface and the outside surface are the same, the jamming phenomenon occurs when the conventional containers 1 in the comparative example are stacked. In contrast, in the case of the containers 10 in the experimental example, the protrusion 31 of the container 10 stacked later may be stopped by the step 21 of the container 10 stacked first, and thus a jamming phenomenon between the containers 10 stacked may be prevented.

Through the experiment, it can be seen that when the formed containers 10 are stacked, a jamming phenomenon between the containers 10 is minimized, compared with the prior art because the containers 10 formed by the container forming apparatus 100 and the method according to the present disclosure include the protrusion 31 on the skirt 30 and the inside surface and the outside surface of the formed skirt 30 are asymmetrically formed.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. A container forming apparatus for forming a container by hot forming, comprising:
    a first mold including a main-body forming part configured to form a main body of the container, a skirt forming part extending upward from the main-body forming part to form a skirt of the container, and a flange forming part extending from an upper end of the skirt forming part in a direction toward the outside to form a lower surface of a flange of the container; and
    a second mold provided over the first mold and vertically movably installed to press an upper surface of the flange, the second mold including a pressing surface configured to press down on a sheet, which is to be formed into the flange, in a location corresponding to the flange forming part,
    wherein the pressing surface includes an extension that is a portion further extending in a direction toward the center of the main-body forming part beyond an inner end portion of the flange forming part and configured to form a protrusion protruding on an inside surface of the skirt,
    wherein the pressing surface is formed in a curved-surface shape, and the extension extends to form a curved surface having the same radius of curvature as the pressing surface,
    wherein the skirt includes, on an outside surface of an upper end portion of the skirt, a groove concavely formed along a circumferential direction of the outside surface of the upper end portion of the skirt, wherein the skirt forming part includes a protrusion protruding along a circumferential direction of the upper end of the skirt forming part to form the groove, wherein the skirt forming part is formed to be inclined in a direction toward the center of the main-body forming part as the skirt forming part extends upward in an area between an upper end of the main body forming part and a lower end of the protrusion, and wherein on a vertical cross-section of the first mold and the second mold, a distance from a line vertically extending from an inner end portion of the extension to a line vertically extending from the inner end portion of the flange forming part is formed to be 1 mm to 5 mm.

2. The container forming apparatus of claim 1, wherein the skirt includes, on an inside surface of an upper end portion of the skirt, the protrusion protruding toward the center of the main body along a circumferential direction of the inside surface of the skirt, and on a vertical cross-section, an inside surface and an outside surface of the skirt are formed in different shapes, and wherein when the sheet, which is to be formed into the flange, is pressed by the pressing surface of the second mold, the sheet is pushed by the extension to conglomerate and form the protrusion.

* * * * *